(12) United States Patent
Dinkel et al.

(10) Patent No.: US 8,424,976 B2
(45) Date of Patent: Apr. 23, 2013

(54) BRAKE SYSTEM FOR MOTOR VEHICLES

(75) Inventors: Dieter Dinkel, Schwalbach (DE); Hans-Jörg Feigel, Rosbach (DE)

(73) Assignee: Continental Teves AG & Co OHG (DE)

( * ) Notice: Subject to any disclaimer, the term of this patent is extended or adjusted under 35 U.S.C. 154(b) by 184 days.

(21) Appl. No.: 13/054,221

(22) PCT Filed: Jul. 16, 2009

(86) PCT No.: PCT/EP2009/059124
§ 371 (c)(1),
(2), (4) Date: Jan. 14, 2011

(87) PCT Pub. No.: WO2010/007119
PCT Pub. Date: Jan. 21, 2010

(65) Prior Publication Data
US 2011/0115282 A1 May 19, 2011

(30) Foreign Application Priority Data

Jul. 18, 2008 (DE) .......................... 10 2008 033 785
Jul. 15, 2009 (DE) .......................... 10 2009 033 499

(51) Int. Cl.
*B60T 13/74* (2006.01)
(52) U.S. Cl.
USPC .................. 303/3; 303/20; 188/359
(58) Field of Classification Search ............. 303/3, 20, 303/115.2, 115.1, 113.4, 155; 188/355, 358, 188/359; 60/562, 566, 591, 593
See application file for complete search history.

(56) References Cited

U.S. PATENT DOCUMENTS

| 4,126,996 A | * | 11/1978 | Leiber ........................ 60/547.1 |
| 4,471,614 A | * | 9/1984 | Hart .............................. 60/562 |
| 4,885,910 A | * | 12/1989 | Resch ............................ 60/562 |
| 5,328,257 A | * | 7/1994 | Tsukamoto ................. 303/115.2 |
| 5,531,509 A | * | 7/1996 | Kellner et al. ............. 303/114.1 |
| 5,567,021 A | * | 10/1996 | Gaillard .......................... 303/3 |

(Continued)

FOREIGN PATENT DOCUMENTS

| DE | 44 30 168 | 2/1996 |
| DE | 197 36 646 | 3/1999 |

(Continued)

OTHER PUBLICATIONS

International Search Report for PCT/EP2009/059124 issued Nov. 26, 2009.

(Continued)

*Primary Examiner* — Robert A Siconolfi
*Assistant Examiner* — Charles Poon
(74) *Attorney, Agent, or Firm* — RatnerPrestia

(57) ABSTRACT

A brake system includes a main brake cylinder and a pedal decoupling unit provided with a holding piston, the first ring surface thereof together with a first primary brake cylinder piston defining a first hydraulic chamber that is hydraulically pressurized with an electrically controllable pressure supply device. In order to improve the pedal characteristics of the brake system, in particular in a brake-by-wire brake system, the holding piston is embodied as a differential piston, the second ring surface thereof defining a second, blockable hydraulic chamber, and a piston effect in the second chamber corresponds to a force that acts counter to the direction of actuation on the holding piston.

21 Claims, 11 Drawing Sheets

U.S. PATENT DOCUMENTS

| | | | | |
|---|---|---|---|---|
| 6,058,705 | A * | 5/2000 | Schunck | 60/562 |
| 6,233,932 | B1 | 5/2001 | Heibel et al. | |
| 6,267,456 | B1 * | 7/2001 | Crombez | 303/115.1 |
| 6,494,546 | B1 | 12/2002 | Feigel | |
| 6,775,979 | B1 * | 8/2004 | Drott et al. | 60/588 |
| 7,069,725 | B2 * | 7/2006 | Delage et al. | 60/566 |
| 7,127,891 | B2 | 10/2006 | Ohlig et al. | |
| 8,261,546 | B1 * | 9/2012 | Paige | 60/562 |
| 2001/0032464 | A1 * | 10/2001 | Inoue et al. | 60/562 |
| 2001/0049941 | A1 * | 12/2001 | Lange et al. | 60/562 |
| 2003/0085613 | A1 * | 5/2003 | Nakano | 303/114.1 |
| 2004/0189086 | A1 * | 9/2004 | Kusano | 303/114.1 |
| 2004/0227396 | A1 * | 11/2004 | Kusano | 303/113.1 |
| 2004/0262993 | A1 * | 12/2004 | Feigel | 303/155 |
| 2005/0057096 | A1 * | 3/2005 | Kudo | 303/155 |
| 2006/0163941 | A1 * | 7/2006 | Von Hayn et al. | 303/155 |
| 2008/0236962 | A1 * | 10/2008 | Suzuki et al. | 188/152 |
| 2008/0236971 | A1 * | 10/2008 | Suzuki et al. | 188/358 |
| 2008/0257670 | A1 * | 10/2008 | Drumm et al. | 188/358 |
| 2008/0258545 | A1 * | 10/2008 | Drumm et al. | 303/114.1 |
| 2008/0258546 | A1 * | 10/2008 | Drumm et al. | 303/115.4 |
| 2008/0265665 | A1 * | 10/2008 | Drumm | 303/116.4 |
| 2010/0225159 | A1 * | 9/2010 | Drumm | 303/20 |

FOREIGN PATENT DOCUMENTS

| | | |
|---|---|---|
| DE | 102 58 266 | 7/2004 |
| DE | 10 2004 025638 | 9/2005 |
| DE | 10 2006 040424 | 3/2008 |
| EP | 1 070 006 | 1/2001 |
| WO | WO 2004/080772 | 9/2004 |

OTHER PUBLICATIONS

German Search Report for DE 10 2009 033 49i9.8 dated Oct. 27, 2009.

* cited by examiner

BRAKE SYSTEM FOR MOTOR VEHICLES

CROSS REFERENCE TO RELATED APPLICATIONS

This application is the U.S. national phase application of PCT International Application No. PCT/EP2009/059124, filed Jul. 16, 2009, which claims priority to German Patent Application No. DE 10 2008 033 785.4, filed Jul. 18, 2008, and German Patent Application No. DE 10 2009 033 499.8, filed Jul. 15, 2009, the contents of such applications being incorporated herein by reference.

FIELD OF THE INVENTION

The present invention relates to a brake system for motor vehicles.

BACKGROUND OF THE INVENTION

The present invention relates to a brake system for motor vehicles which can be actuated in a brake-by-wire operating mode both by the vehicle driver and independently of the vehicle driver, and is preferably operated in the brake-by-wire operating mode and can be operated in a fallback operating mode without brake boosting, in which fallback operating mode only operation by the vehicle driver is possible. Such a brake system is known from international patent application WO 2004/080772 A1, which is incorporated by reference. The elastic element of the simulator device is embodied as a compression spring which is arranged in terms of its effect between the input force element and the restraining piston. Consequently, the restraining piston has to be held in the (normal) brake-by-wire operating mode against a stop which is fixed to the housing in order to make available a stable abutment to the aforementioned compression spring. When rapid activation of the pedal occurs in the previously known brake system, there is the problem that the electrically controllable pressure supply device, which is embodied as a motor pump assembly, cannot build up the necessary restraining pressure with the same dynamic so that a temporary movement of the restraining piston away from its stop can take place. This movement results in a brake pedal sensation which is unpleasant for the vehicle driver.

SUMMARY OF THE INVENTION

An object of the present invention is therefore to ensure improvement of the pedal sensation in a brake system of the generic type mentioned at the beginning, in particular in brake-by-wire brake systems. In this context, the temporary dipping of the restraining piston when dynamic activation occurs is to be largely avoided.

This object is achieved in a brake system according to aspects of the present invention in that the restraining piston is embodied as a stepped piston whose annular face bounds a hydraulic space which can be shut off, wherein a pressure effect in the space corresponds to a force which acts on the restraining piston counter to the activation direction.

The hydraulic space can preferably be connected to the pressure medium reservoir vessel via a check valve.

The electrically controllable pressure supply device can preferably be connected directly to one of the master brake cylinder pressure spaces. A 2/2 way valve which is closed when no current is flowing (CC) and which can be activated electromagnetically is particularly preferably inserted into the connection between the pressure supply device and the master brake cylinder pressure space.

The electrically controllable pressure supply device of the brake system according to aspects of the invention is preferably embodied as a hydraulic cylinder-piston arrangement whose piston can be driven by means of an electric motor.

According to one preferred embodiment of the brake system according to aspects of the invention, a high pressure accumulator is provided which can be charged by the electrically controllable pressure supply device. A check valve (also referred to as an accumulator charging valve) is advantageously inserted into the hydraulic connection between the high pressure accumulator and the electrically controllable pressure supply device.

A hydraulic brake pressure modulation unit, which permits brake-circuit-specific or wheel-selective braking processes, is preferably inserted between the master brake cylinder and the wheel brakes.

The brake pressure modulation unit advantageously has pressure regulating valves for carrying out a braking process according to what is referred to as the multiplex principle.

According to one development of the brake system according to aspects of the invention, all the 2/2 way valves which can be activated electromagnetically, the pressure sensors, the pressure supply device and a rotor position sensor which senses the rotor position of an electric motor which forms a component of the pressure supply device are integrated in a hydraulic valve block.

The valve block preferably contains the pedal decoupling unit with its housing and the simulator device and can be attached to a splash board of the motor vehicle.

It is likewise preferred that the sensor device for sensing the driver deceleration request be integrated into the valve block and connected to the electronic open-loop and closed-loop control unit without external cables.

BRIEF DESCRIPTION OF THE DRAWINGS

The invention is best understood from the following detailed description when read in connection with the accompanying drawings. Included in the drawings are the following figures.

DETAILED DESCRIPTION OF THE INVENTION

Figure 1:
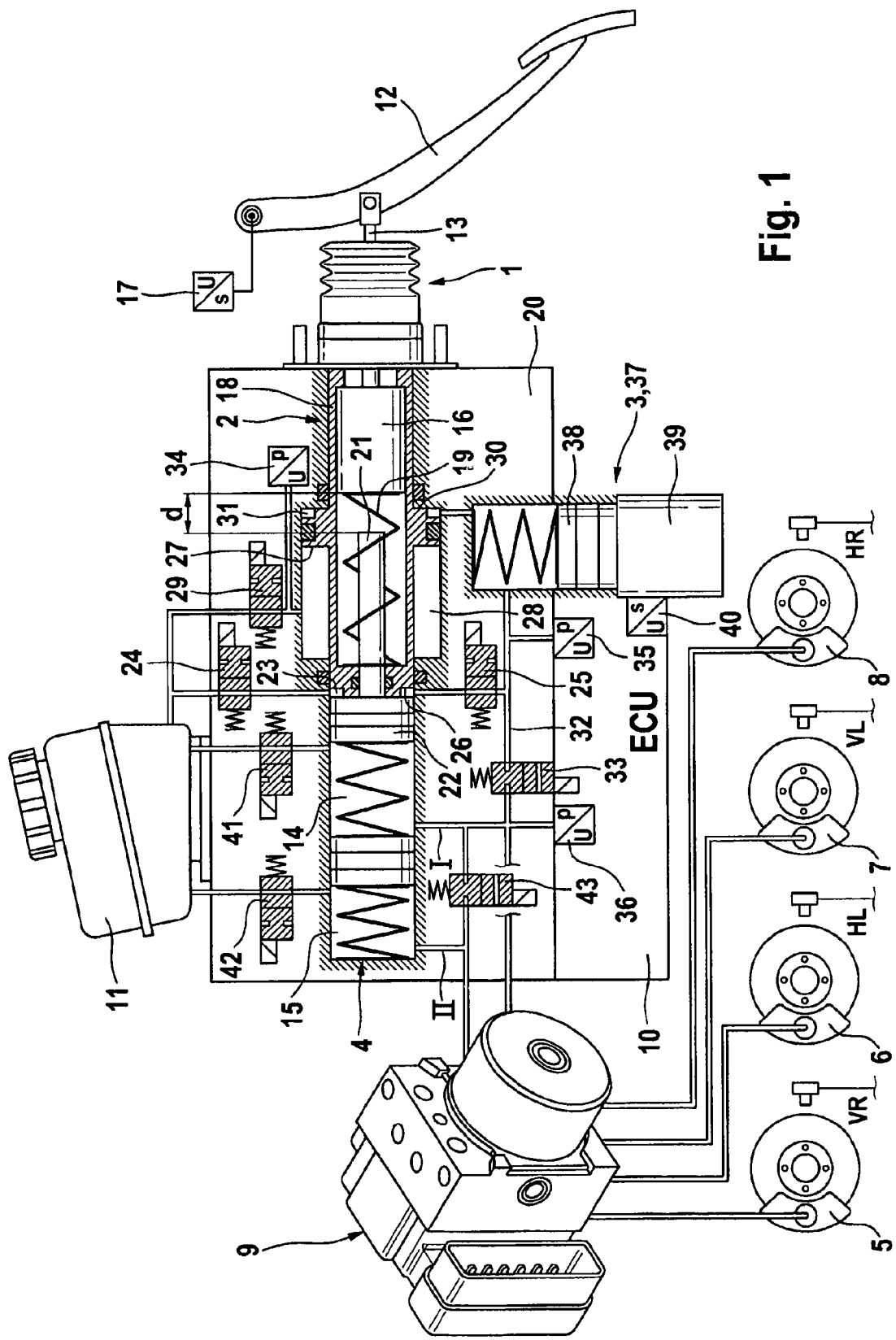
FIG. 1 shows a first embodiment of a brake system according to aspects of the present invention.

The brake system according to aspects of the invention which is illustrated in FIG. 1 is composed essentially of an activation device 1, a pedal decoupling unit 2, an electrically controllable pressure supply device 3, wherein the activation device 1 and the pressure supply device 3 form a brake booster, as well a master brake cylinder or tandem master cylinder 4 which is connected downstream of the brake booster in terms of effect and whose pressure spaces 14, 15 can be connected by means of known, so-called expansion holes (not illustrated), to which chambers, under atmospheric pressure, of a pressure medium reservoir vessel 11 can be connected. Furthermore, the aforementioned pressure spaces 14, 15 are connected to the pressure medium reservoir vessel 11 via 2/2 way valves 41, 42 which are preferably open when no current is flowing (OC) and can be activated electromagnetically, and their function will be explained later. On the other hand, wheel brake circuits I, II, which supply the wheel brakes 5-8 of a motor vehicle with hydraulic pressure medium with intermediate connection of a hydraulic assembly or of a controllable wheel brake pressure modulation module 9, are connected to the pressure spaces 14, 15. Furthermore, the wheel brake circuits I, II can be connected by means of a hydraulic connection in which a 2/2 way valve 43 which is preferably closed when no current is flowing (CC) and can be activated electromagnetically is inserted, the function of which 2/2 way valve 43 will also be explained later.

The wheel brake pressure modulation module 9 has pressure modulation valves (not denoted in more detail) which are connected upstream of the wheel brakes 5-8 and which permit, for example, ABS braking processes and/or ESP braking processes. In this context, eight pressure modulation valves are necessary for carrying out the ABS braking operations and twelve pressure modulation valves are necessary for carrying out the ESP braking operations. Of course, as an alternative to the wheel brake pressure modulation module illustrated, it is also possible to use a significantly simpler wheel brake pressure modulation module with four pressure modulation valves, which permits wheel brake pressure modulation according to what is referred to as a multiplex principle, which is known to a person skilled in the art (see in particular FIG. 3). Furthermore, the brake system which is shown has an electronic open-loop and closed-loop control unit 10 which is merely indicated schematically. The activation device 1, which is arranged in a housing 20 in which the tandem master cylinder 4 is also integrated, can be actuated by means of a brake pedal 12 which is connected in effective terms to an input force element 16 via an activation rod 13. The activation travel of the brake pedal 12 is sensed indirectly using the rotational angle of the brake pedal 12 by means of a sensor device 17. The previously mentioned pedal decoupling unit 2 has essentially a restraining piston 18 in the interior of which the input force element 16 is guided in a displaceable fashion and which is supported on a compression spring 19 which represents a simulation device which gives the driver of the vehicle a pleasant pedal sensation in the brake-by-wire operating mode. An end face, facing the master brake cylinder 4, of the restraining piston 18, which is embodied as a stepped piston in the example shown, is embodied as a first annular face 26, serves as a guide of an axial protrusion 21 of a primary piston 22 and bounds therewith a first hydraulic chamber 23 which is connected to the electrically controllable pressure supply device 3, on the one hand, via a 2/2 way valve 24 which is preferably open when no current is flowing (OC) and can be activated electromagnetically, and, on the other hand, via a second 2/2 way valve 25 which is also open when no current is flowing (OC) and can also be activated electromagnetically. The axial protrusion 21 is in the state of rest shown in FIG. 1, at an axial distance from the input force element 16 which is denoted by d.

FIG. 1 also shows that a second annular face 27 of the restraining piston 18 bounds, in the housing 20, a hydraulic second chamber 28 which can be shut off and which is connected to the pressure medium reservoir vessel 11 via a 2/2 way valve 29 which is open when no current is flowing (OC) and can be activated electromagnetically. The hydraulic pressure which is present in the second chamber 28 is sensed by means of a first pressure sensor which is provided with the reference sign 34. Finally, a third annular face 30 of the restraining piston 18 in the housing 20 bounds a third hydraulic chamber 31 to which pressure supplied by the electrically controllable pressure supply device 3 can be applied. In this context, the ratio of the third annular face 30 to the first annular face 26 of the restraining piston 18 constitutes a pressure transmission ratio which makes it possible to generate a higher pressure in the master brake cylinder 4 at a given value of the pressure supplied by the electrically controllable pressure supply device 3. Finally, a line 32 which can be shut off by means of a fourth 2/2 way valve 33 which can be activated electromagnetically connects the outlet of the electrically controllable pressure supply device 3 to the first or primary pressure space 14 of the master brake cylinder 4. In this context, the pressure which is supplied by the pressure supply device 3 is sensed by means of a second pressure sensor 35, while the value of the hydraulic pressure which is applied in the primary pressure space 14 can be determined by a third pressure sensor 36.

Finally, from FIG. 1 it is apparent that the electrically controllable pressure supply device 3 is embodied as an electrohydraulic actuator which is composed essentially of a hydraulic cylinder-piston arrangement 37 and an electric motor 39 which drives the piston 38 of the aforementioned arrangement 37, preferably with intermediate connection of a so-called Rot-Trans transmission (not illustrated). A travel sensor or position sensor 42 which is indicated only schematically senses the activation travel of the piston 38 and/or the angular position of the rotor (not illustrated) of the electric motor 39.

The design of the second variant (illustrated in FIG. 2) of the brake system according to aspects of the invention corresponds largely to the first embodiment shown in FIG. 1, wherein the same reference signs are used for the same components. In order to increase the dynamics of the brake system according to aspects of the invention shown in FIG. 1, in particular during pressure buildup processes, a high pressure accumulator 44 is provided which can preferably be charged by the electrically controllable pressure supply device 3, described in conjunction with FIG. 1, with intermediate connection of a check valve or accumulator charging valve 45.

Figure 2:
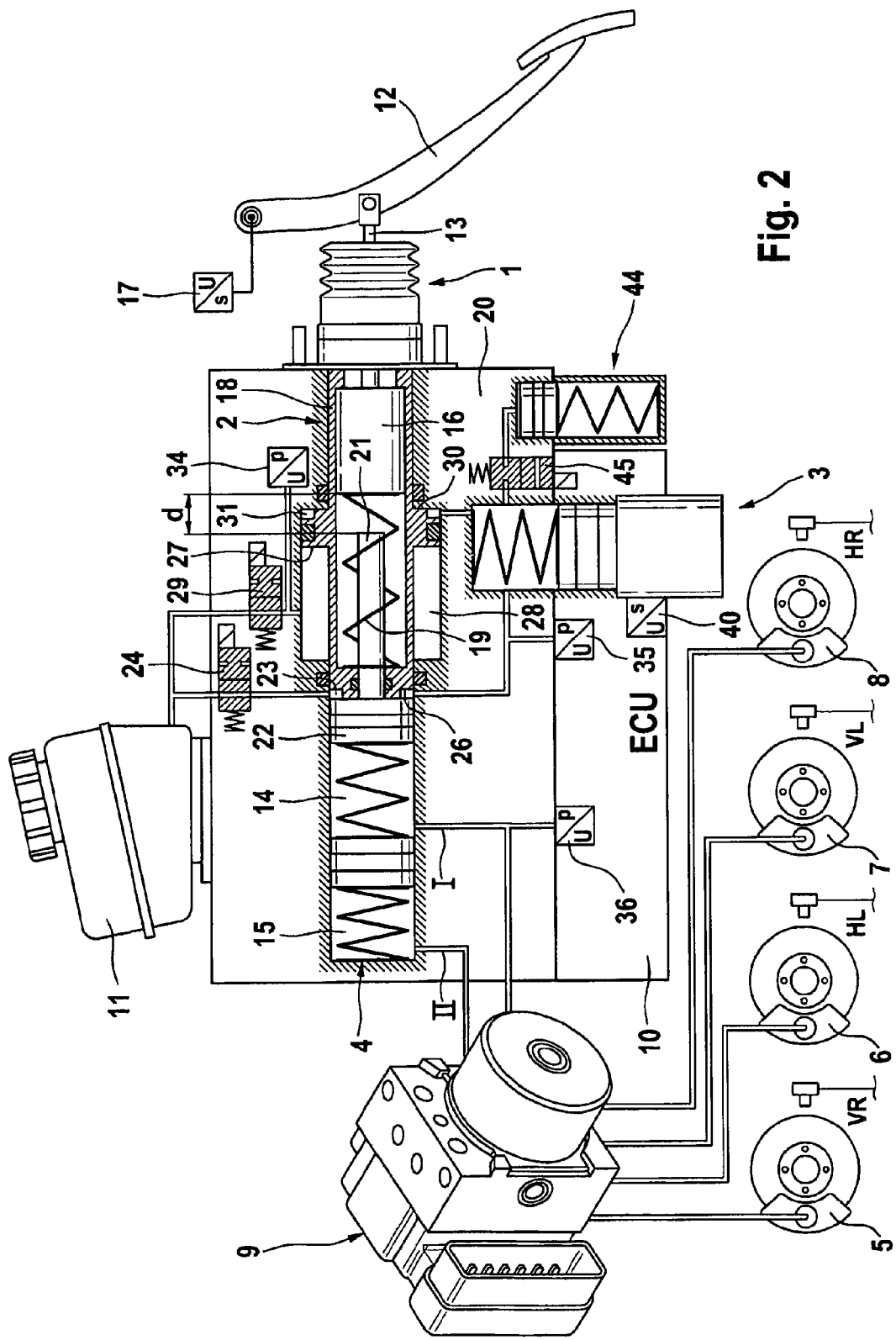
FIG. 2 shows a second embodiment of a brake system according to aspects of the present invention.

The brake systems shown in FIGS. 1 and 2 are each illustrated in the unactivated state. The illustrated state of the individual components of the brake systems according to aspects of the invention, except in the positions of the brake pedal 12, input force elements 16, the length of the simulator spring 19 and the switched state of the valves 24 and 29, corresponds simultaneously to a brake operating mode in a hybrid vehicle in which the braking which is necessary in accordance with the brake pedal position is carried out by means of a generator operating mode of the drive motor (recuperative braking) which is present in the vehicle, and there is no need for a hydraulic buildup of brake pressure.

Figure 3:
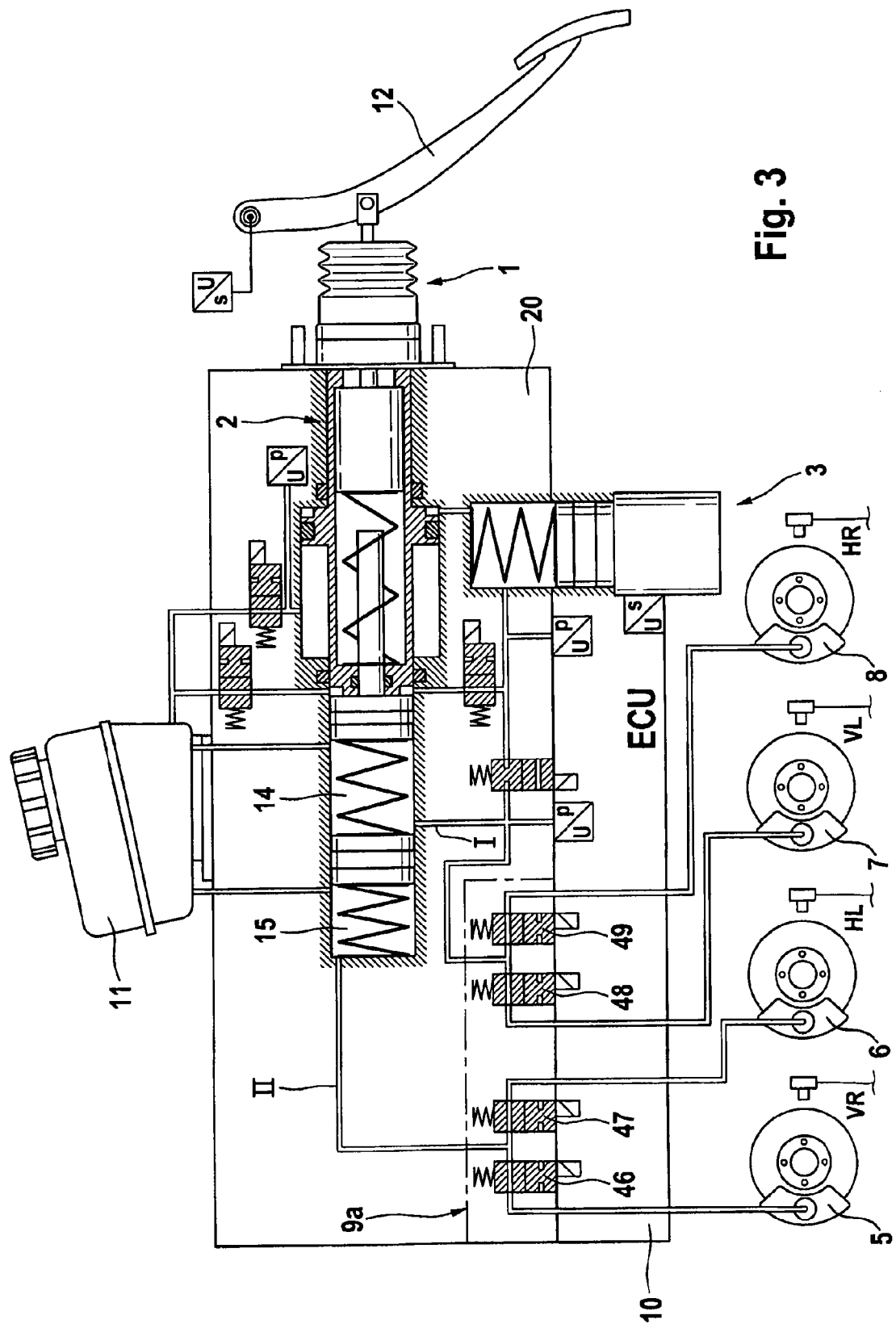
FIG. 3 shows a simplified illustration of a brake system according to aspects of the invention which is modified compared to FIG. 1 and is in the unactivated state.

In the embodiment which is shown in FIG. 3 and is simplified compared to the brake system illustrated in FIG. 1, a wheel brake pressure modulation module 9a which is indicated only schematically is integrated into the previously mentioned housing 20 and is composed essentially of four pressure modulation valves 46, 47, 48, 49, which are individually assigned to the wheel brakes 5, 6, 7, 8 and are suitable for carrying out pressure regulating processes according to the so-called multiplex principle. A multiplex operating mode in brake systems is known to a person skilled in the art and does not need to be explained in more detail in the present context.

Figure 4:
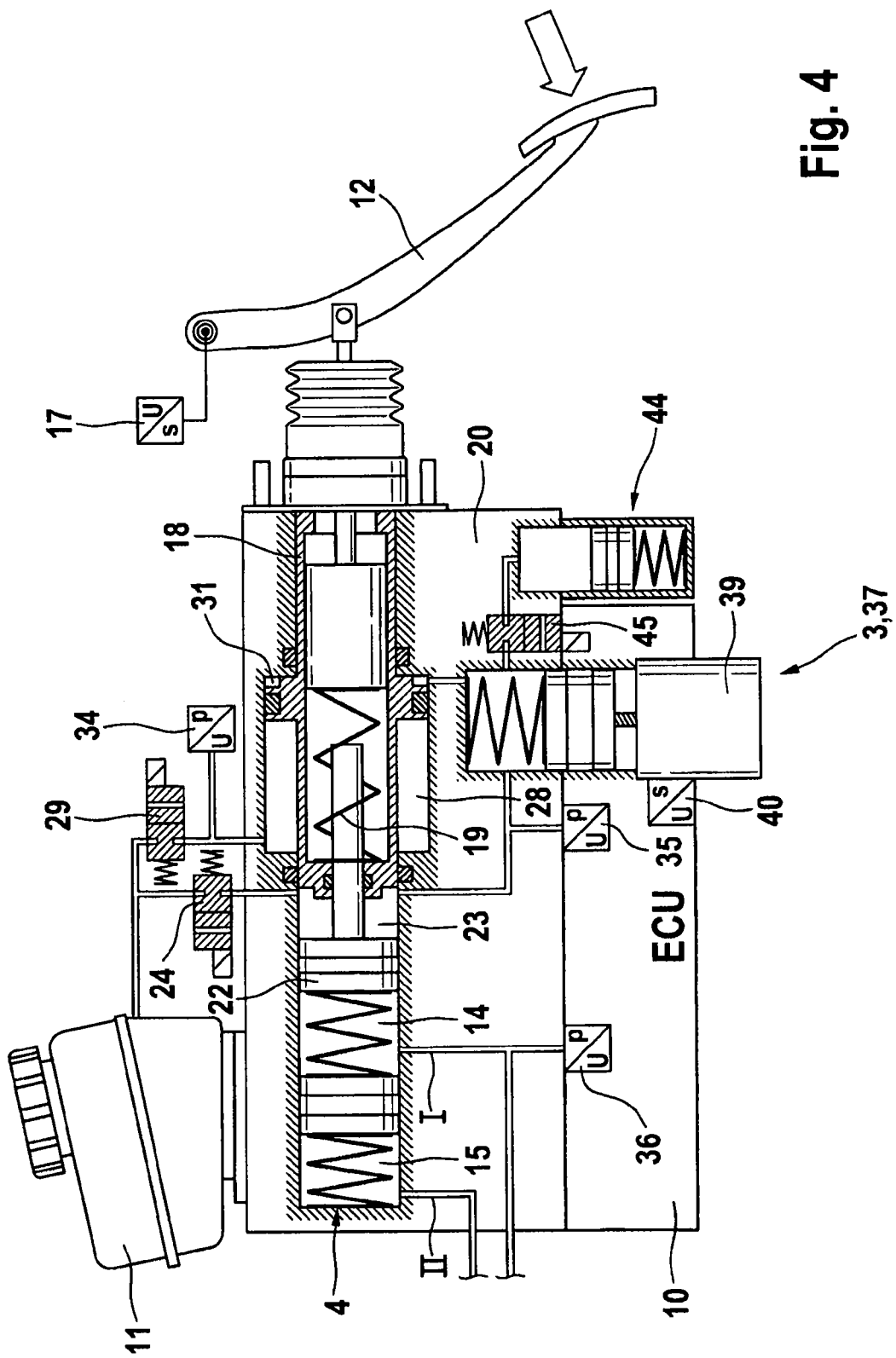
FIGS. 4 to 11 show various operating modes of the brake systems according to aspects of the invention which are illustrated in FIGS. 1 and 2.

In the normal braking mode illustrated in FIG. 4, which corresponds to the so-called brake-by-wire operating mode, the 2/2 way valves 24, 29 which are open when no current is flowing and have been mentioned in conjunction with FIGS.

1 and 2 are energized when there is a signal from the brake pedal travel sensor 17, with the result that the hydraulic connections of the first chamber 23 and those of the second chamber 28 to the pressure medium reservoir vessel 11 are shut off. Accordingly, when there is subsequent activation of the electrically controllable pressure supply device 3 or 37, no movement of the restraining piston 18 is possible. Pressure medium volume which is expelled by the pressure supply device 3 or 37 flows via the (OC) 2/2 way valve 25 (see FIG. 1) which is not shown in FIG. 4 into the first hydraulic chamber 23 and brings about a movement of the master brake cylinder piston 22 to the left, and therefore an increase in pressure in the master brake cylinder pressure spaces 14, 15 and in the motor vehicle wheel brakes 5-8 (not illustrated in FIG. 4). In this context, the values of the pressure which is applied in the first chamber 23, the second chamber 28 and in the primary pressure space 14 of the master brake cylinder 4 are sensed by the pressure sensors 35, 34 and 36 and signaled to the electronic open-loop and closed-loop control unit 10. During the activation of the brake pedal, the simulator spring 19 is compressed, as a result of which a pleasant pedal sensation is conveyed to the vehicle driver. An operating mode (not illustrated) is also conceivable in which the first hydraulic chamber 23 is shut off and the connection of the second chamber 28 to the pressure medium reservoir vessel 11 is opened and the pressure supplied by the pressure supply device 3 is applied to the third chamber 31 so that a pressure increase occurs in the master brake cylinder 4. In this operating mode, an additional pressure medium volume for the primary pressure space 14 can also be made available from the region of the pressure supply device 3 (without a boosting factor).

Figure 5:
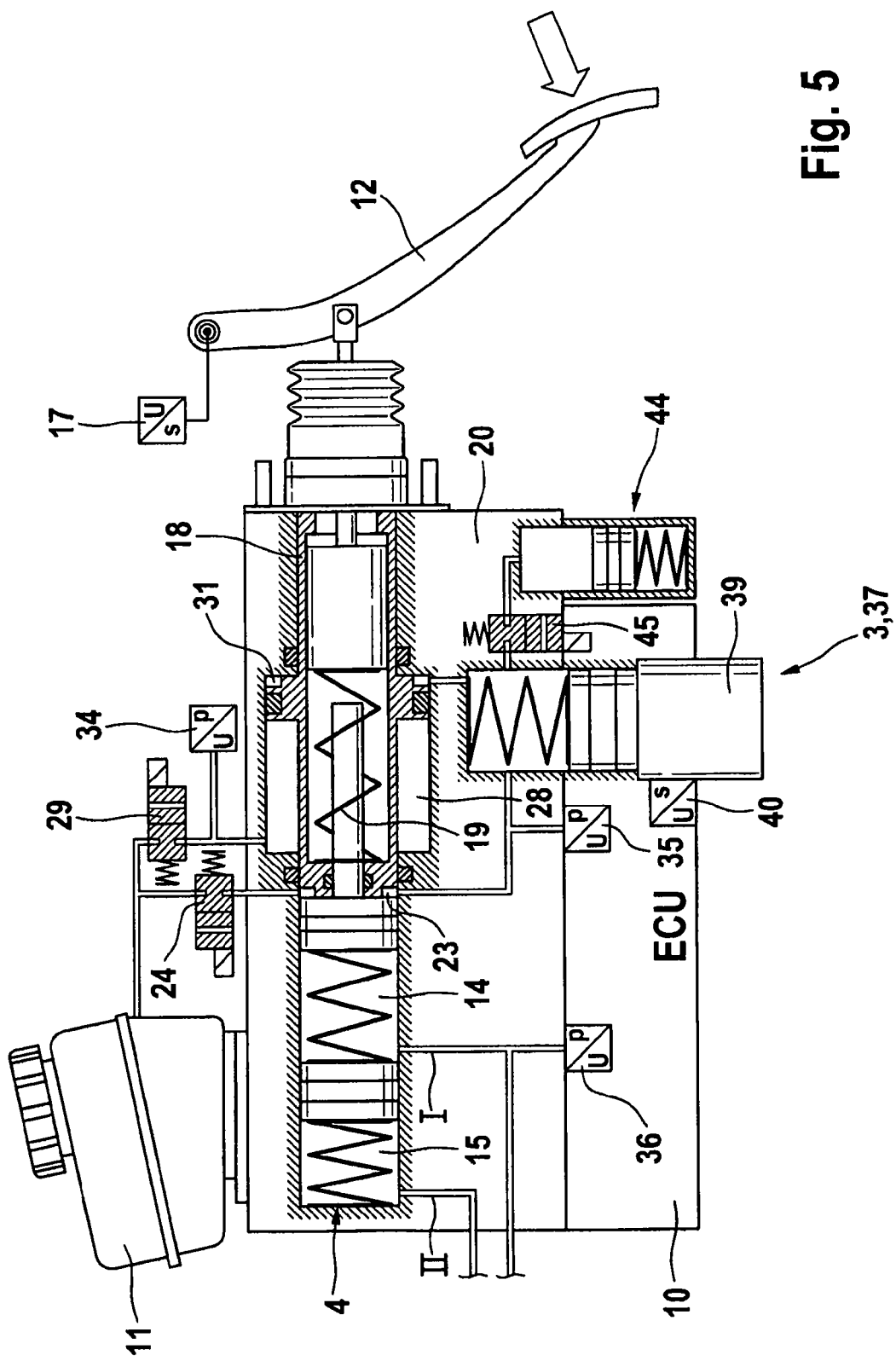

A so-called hybrid operating mode in which the motor vehicle is braked exclusively by the (electric) drive motor and in which no hydraulic buildup of brake pressure is necessary is illustrated in FIG. 5. If a signal appears at the output of the travel sensor or rotational angle sensor 17 which senses the driver's deceleration request, the 2/2 way valves 24, 29 (mentioned above) which are open when no current is flowing (OC) and are electromagnetically switchable are switched over into their closed position, as a result of which the hydraulic connections of the two hydraulic chambers 23, 28 to the pressure medium reservoir vessel 11 are shut off. In this context, the restraining piston 18 which is in its blocked position constitutes a fixed support of the simulator spring 19 which is correspondingly compressed by the braking force applied at the brake pedal 12 (the distance d becomes smaller).

Figure 6:
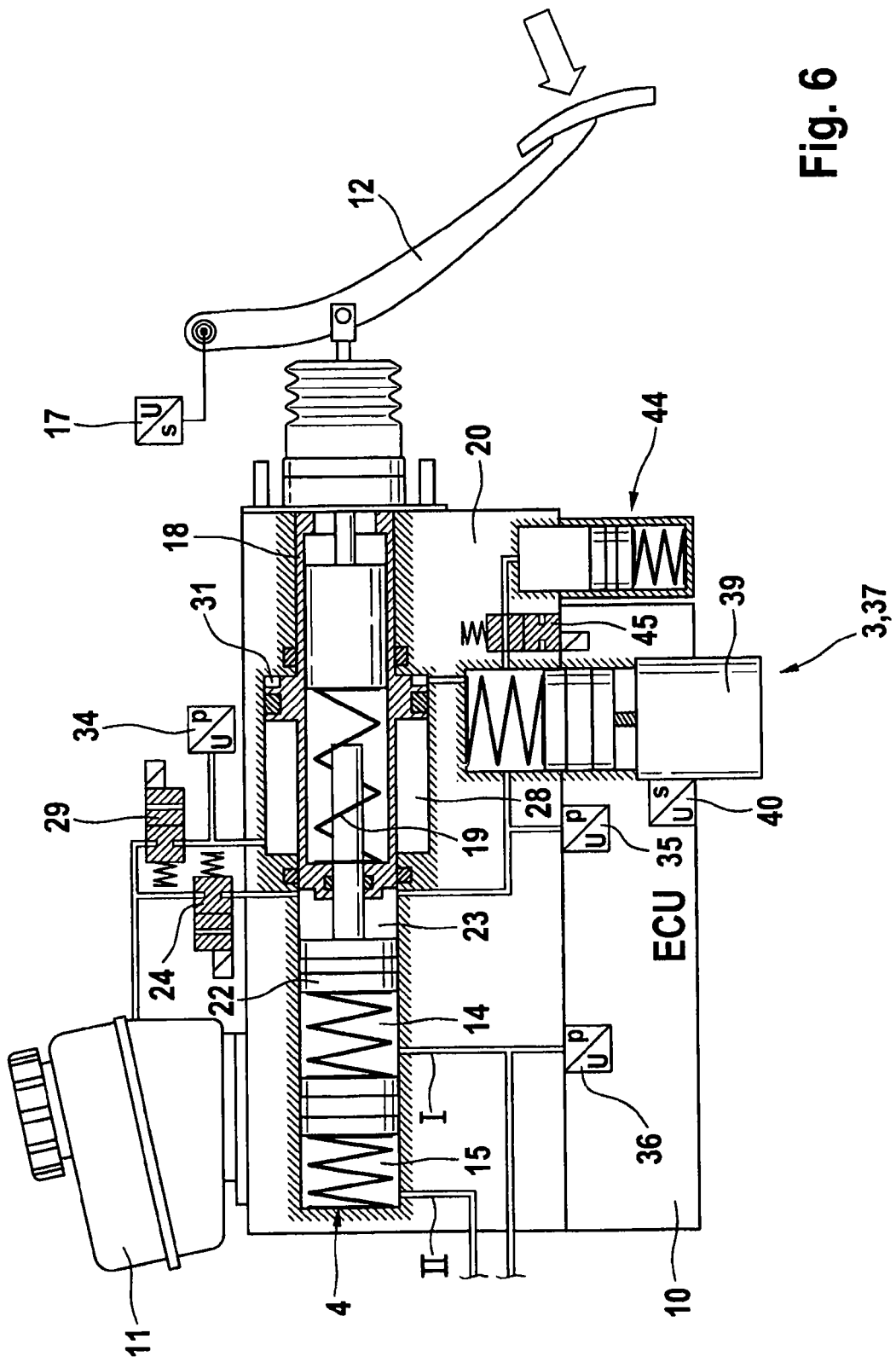

A highly dynamic braking process is illustrated in FIG. 6.

When a signal appears at the outlet of the travel sensor or rotational angle sensor 17 which senses the driver's deceleration request, which signal represents rapid activation of the brake pedal 12, the 2/2 way valves 24, 29 (OC) are switched over into their closed position for the purpose of shutting off the two hydraulic chambers 23, 28. At the same time as the activation of the electrically controllable pressure supply device 3, the accumulator charging valve or check valve 45 which is mentioned in conjunction with FIG. 2 is switched over into its open switched position so that, in addition to a quantity of pressure medium which is made available by the pressure supply device 3, the pressure medium which is under high pressure in the high pressure accumulator 44 is applied to the first hydraulic chamber 23. The described process results in a rapid buildup of pressure in the first chamber 23 and therefore in the master brake cylinder 4. The pressure value which is applied to the first chamber 23 is sensed by the pressure sensor 35, while the pressure prevailing in the first pressure space 14 is determined by the second pressure sensor 36.

Figure 7:
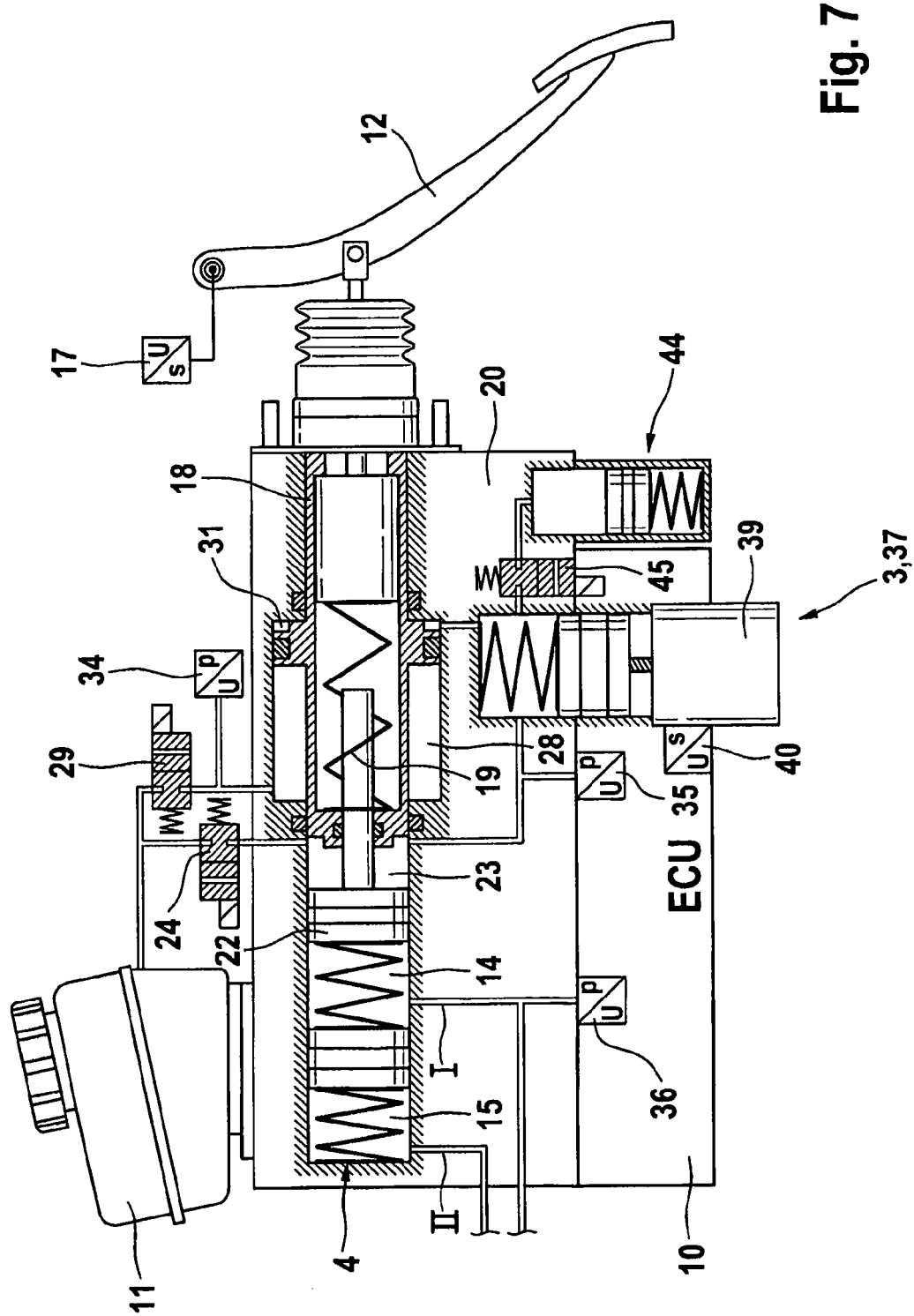

An autonomous buildup of pressure for assistance functions in which all the hydraulic components assume the switched positions described in conjunction with FIG. 4 is illustrated in FIG. 7. The electrically controllable pressure supply device 3 is actuated by actuating signals of the electronic open-loop and closed-loop control unit 10 in accordance with the requests by an assistance system present in the motor vehicle, for example an electronic adaptive cruise control system, without activation of the brake pedal 12 by the driver.

Figure 8:
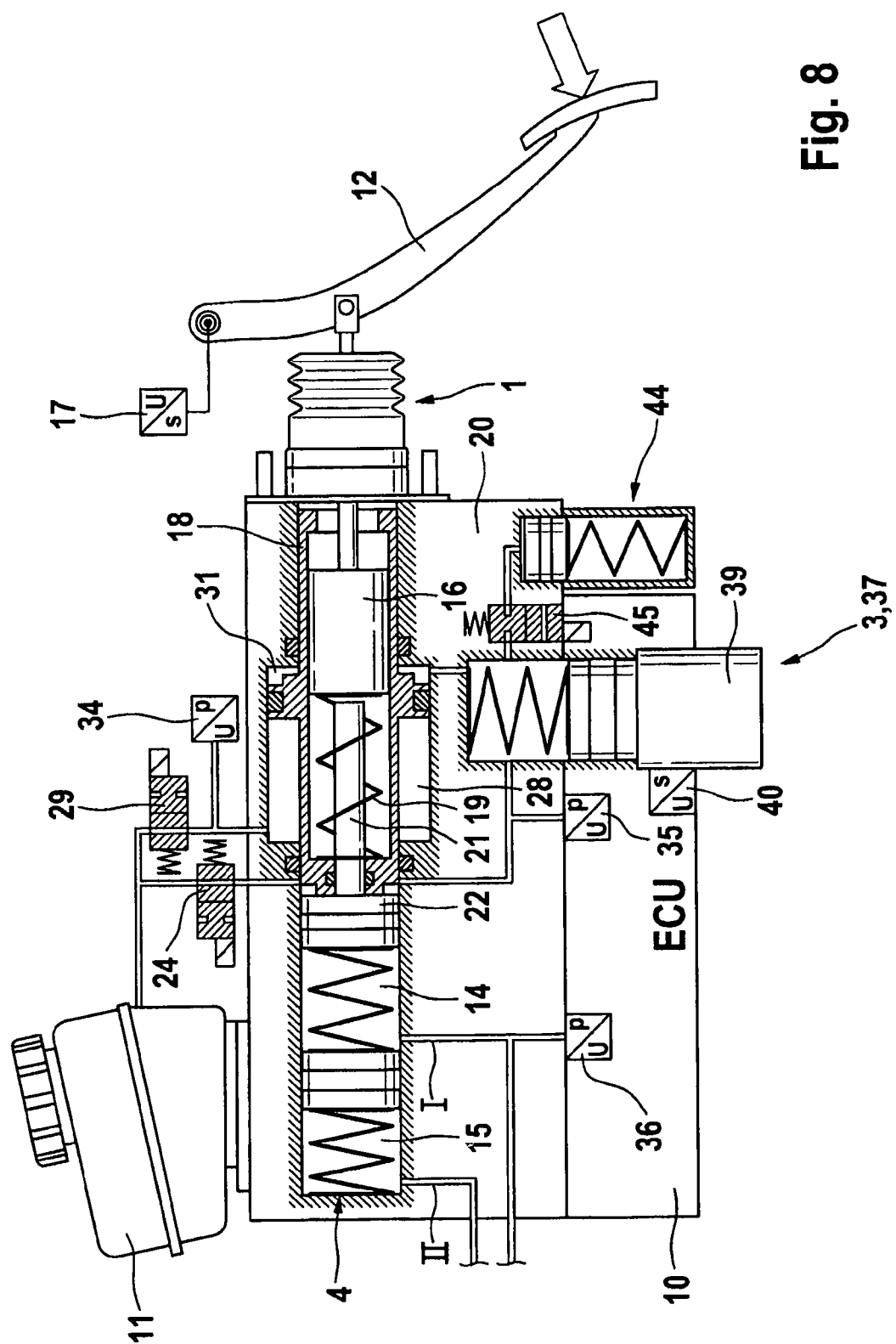
Figure 9:
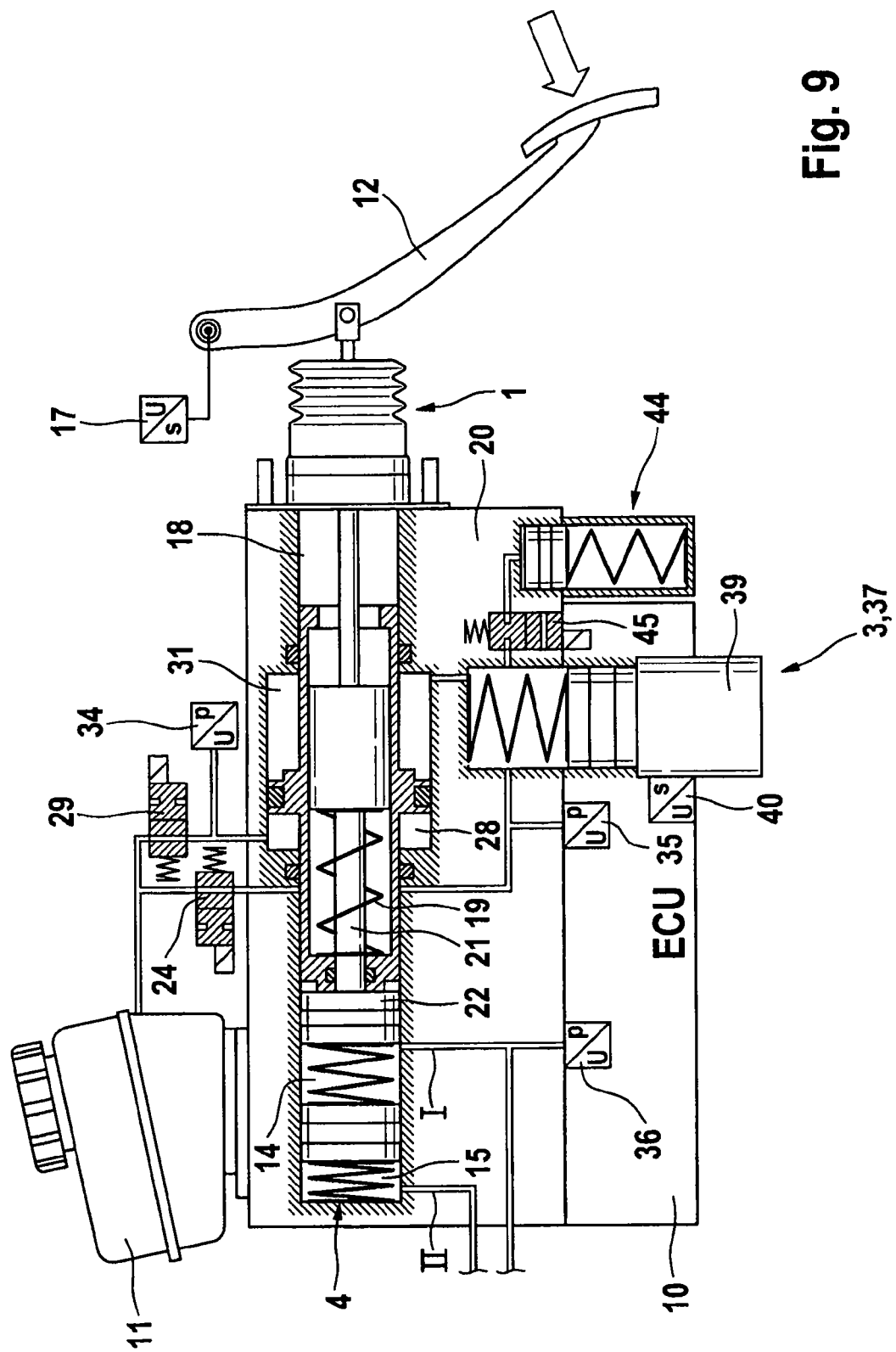

FIGS. 8 and 9 each show a state of the brake system according to aspects of the invention which is due to a lack of a power supply and which is referred to as a fallback level. In the state shown in FIG. 8, the activation force which is applied to the brake pedal 12 by the driver is transmitted to the first piston 22 or primary piston 22 of the master brake cylinder 4 via the input force element 16, the compressed simulator spring 19 and the restraining piston 18. The activation travel carried out by the brake pedal 12 corresponds to the sum of a first travel component, which is due to the pressure medium volume takeup by the brake system connected downstream of the master brake cylinder 4, and of a travel component which corresponds to the compression of a simulator spring 19. When a relatively large brake pedal force is acting and results in relatively strong activation of the activation device 1 (see FIG. 9), the further brake pedal travel corresponds to the state (shown in FIG. 8) of the pressure medium volume takeup of the brake system which is connected downstream of the master brake cylinder 4, since the activation of the master brake cylinder 4 takes place by means of direct mechanical transmission of the input force from the input force element 16 to the axial protrusion 21 of the master cylinder piston 22.

Figure 10:
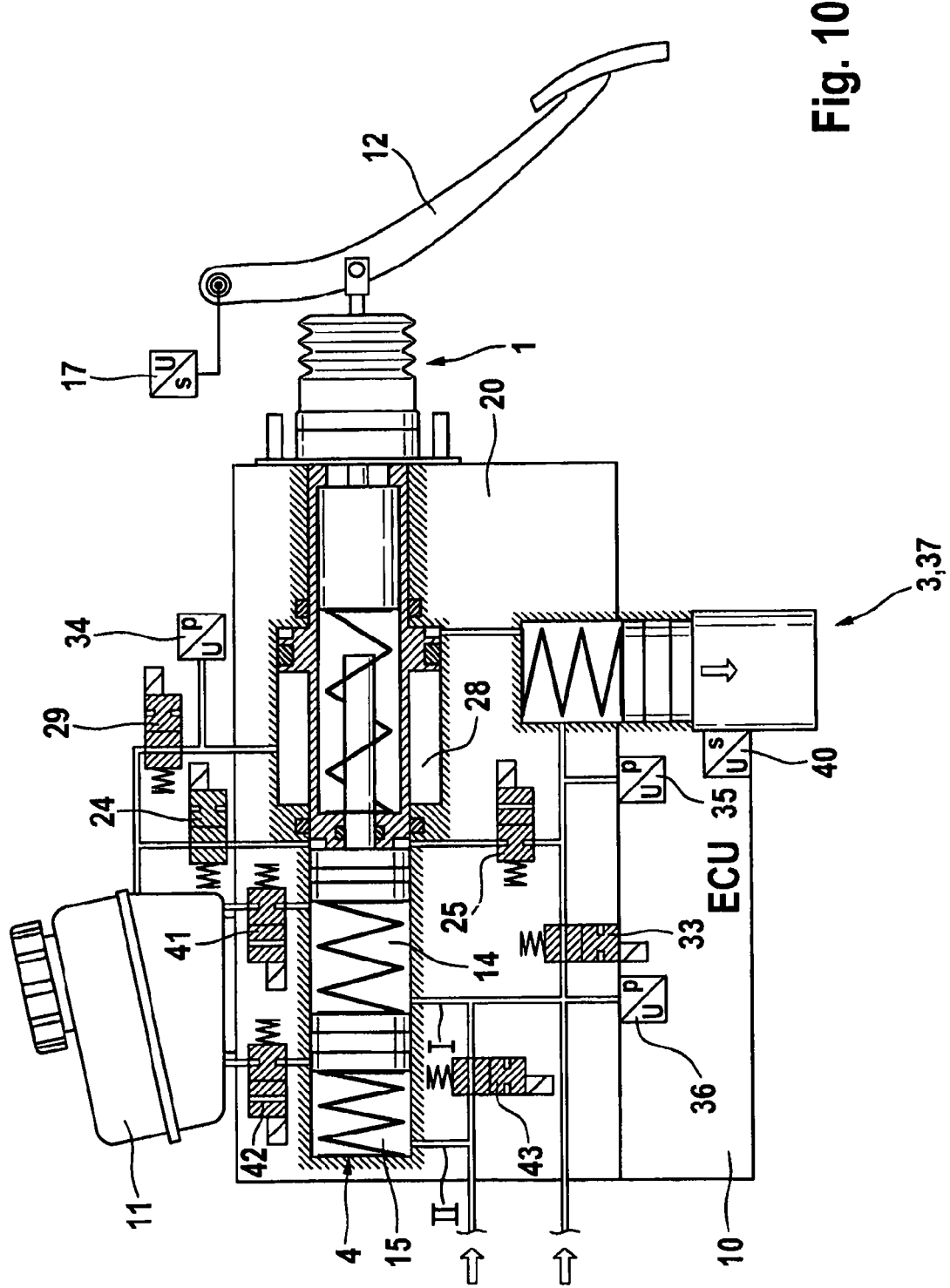

The type of actuation of the brake system according to aspects of the invention which is shown in FIG. 10 is appropriate in particular when self-resetting brake calipers are used which have no or little residual braking torque. In this context, the 2/2 way valves 25, 41, 42 which are open when no current is flowing (OC) and are mentioned in conjunction with FIG. 1 are switched over into their closed switched position and the 2/2 way valve 43 which is closed when no current is flowing (CC) and is switched between the master brake cylinder pressure spaces 14, 15 as well as the 2/2 way valve 33 which is closed when no current is flowing (CC) and is inserted between the electrically controllable pressure supply device 3 and the primary pressure space 14 of the master brake cylinder 4 are switched over into their open switched position. Given subsequent actuation of the pressure supply device 3 in the direction opposite to the activation direction, a defined quantity of pressure medium volume is sucked out of the wheel brakes 5-8 (not illustrated in FIG. 10), so that the resulting underpressure permits the brake linings to be pulled back and therefore allows the brake disks to freewheel. After this, all the abovementioned 2/2 way valves are switched back into their unactivated position.

Figure 11:
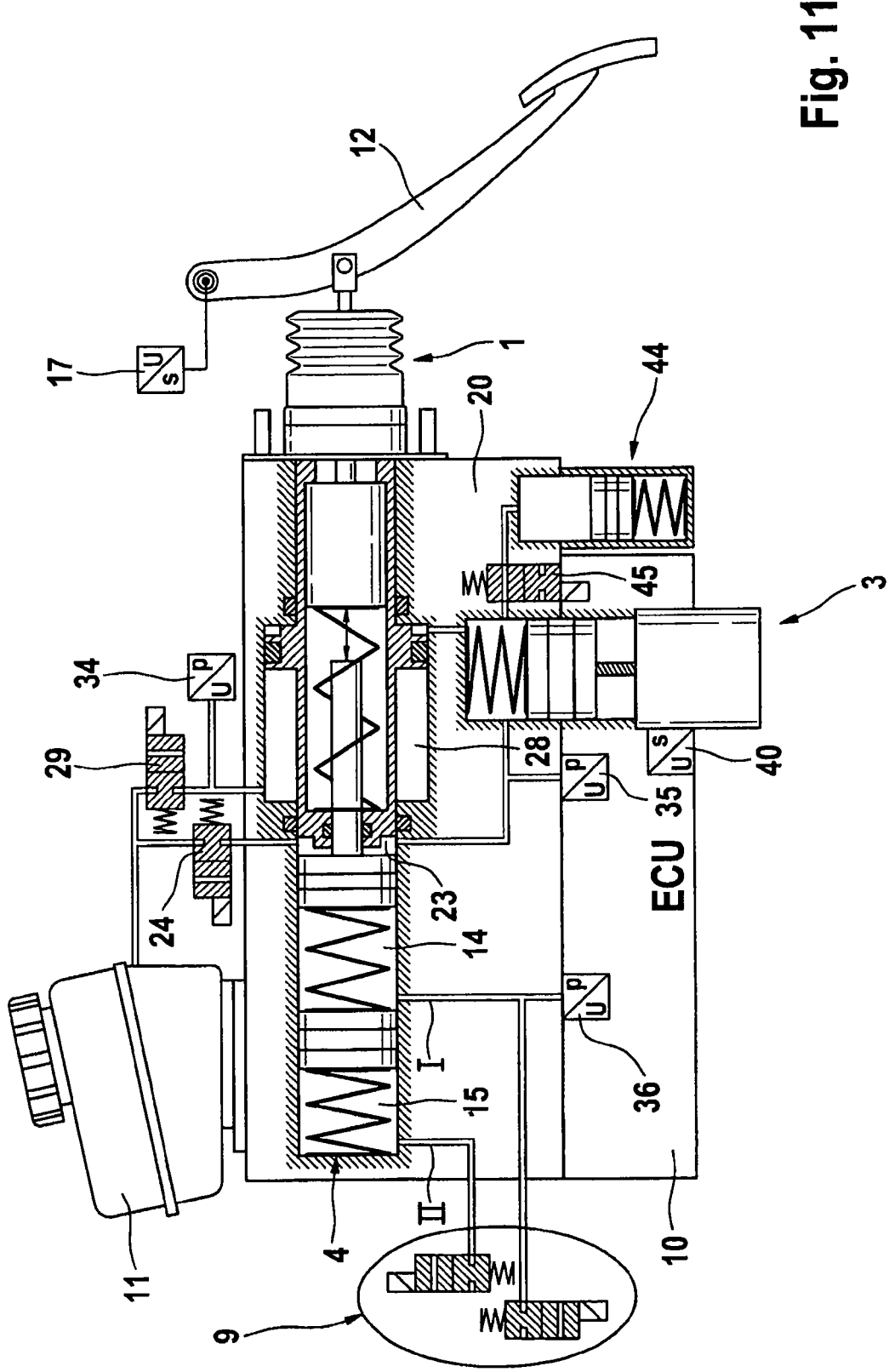

Finally, FIG. 11 shows an operating mode in which the high pressure accumulator 44 is charged by the pressure supply device 3. In this context, both brake circuits I, II are shut off by isolating valves contained in the wheel pressure modulation module 9 which is only indicated schematically and the first and the second hydraulic chambers 23, 28 are shut off and the accumulator charging valve 45 is opened, so that the pressure medium volume which is expelled by the pressure supply device 3 charges the high pressure accumulator 44. The pressure made available by the pressure supply device 3 is monitored by the pressure sensor 35.

Within the scope of the present invention, further modifications are of course conceivable. It is therefore possible, for example in order to check the function of the fallback level, to move the restraining piston by actuating the pressure supply device 3. Another conceivable measure relates to the configuration of the distance "d" which is virtually zero in this variant, and in the case of regenerative braking by means of the electric motor which operates in the generator mode and drives a hybrid vehicle the 2/2 way valve 33 which is closed when no current is flowing (CC) is opened in order to suppress a hydraulic buildup of pressure, wherein the pressure medium volume, displaced by the driver by means of the axial protrusion 21, of the primary pressure space 14 is expelled into the first hydraulic chamber 23.

The invention claimed is:

1. A brake system for motor vehicles which is configured to be actuated in a brake-by-wire operating mode both by a vehicle driver and independently of the vehicle driver, said brake system comprising:
    a sensor device for sensing a driver deceleration request,
    an input force element which is coupled to a brake pedal via a pushrod,
    a master brake cylinder which has at least one master cylinder piston, and is connected to wheel brake circuits of a vehicle,
    a pressure medium reservoir vessel which is assigned to the master brake cylinder and to which pressure spaces of the master brake cylinder are connected,
    an electrically controllable pressure supply device,
    an electronic open-loop and closed-loop control unit for actuating the electrically controllable pressure supply device with the effect of performing closed-loop control of the hydraulic pressure which is output by it,
    a pedal decoupling unit which is connected upstream of the master brake cylinder and which has a restraining piston which accommodates, in a hydraulically sealed fashion, an axial protrusion of the master cylinder piston, which can be connected in a force-transmitting fashion to the master cylinder piston and having a first annular face that bounds, with the master cylinder piston, a first hydraulic chamber to which the pressure which is output by the electrically controllable pressure supply device is applied, wherein application of pressure to the chamber brings about a force effect on the master cylinder piston in the activation direction and on the restraining piston counter to the activation direction, and
    a simulation device with at least one elastic element, which simulation device provides a vehicle driver with a pedal sensation in the brake-by-wire operating mode and which is arranged between the input force element and the restraining piston,
    wherein the restraining piston is a stepped piston having a second annular face that bounds a second hydraulic chamber which is configured to be shut off, wherein a pressure effect in the second hydraulic chamber corresponds to a force which acts on the restraining piston counter to the activation direction.

2. The brake system as claimed in claim 1, wherein the restraining piston has a third annular face which bounds a third hydraulic chamber to which the pressure which is output by the electrically controllable pressure supply device is applied in such a way that a pressure effect in the third chamber corresponds to a force which acts on the restraining piston in the activation direction.

3. The brake system as claimed in claim 2, wherein a ratio of the third annular face to the first annular face constitutes a pressure transmission ratio which makes it possible to generate a higher pressure in the master brake cylinder at a given pressure of the electrically controllable pressure supply device.

4. The brake system as claimed in claim 1, wherein the electrically controllable pressure supply device is configured to be directly connected to one of the master brake cylinder pressure spaces.

5. The brake system as claimed in claim 1, wherein a high pressure accumulator is provided which is configured to be charged by the electrically controllable pressure supply device.

6. The brake system as claimed in claim 1 further comprising a 2/2 way valve which is configured to be activated electromagnetically and is open in the currentless state (OC), wherein the 2/2 way valve is inserted between the first hydraulic chamber and the electrically controllable pressure supply device.

7. The brake system as claimed in claim 1, wherein the first hydraulic chamber is connected to the pressure medium reservoir vessel via a hydraulic connection which is configured to be shut off.

8. The brake system as claimed in claim 1, wherein in a nonactivated state of the brake system, the input force element is arranged at a predetermined distance (d) from the protrusion of the master cylinder piston.

9. The brake system as claimed in claim 8, wherein the distance (d) is dimensioned in such a way that no force-transmitting contact between the input force element and the protrusion takes place in a brake pedal position which represents deceleration of the vehicle and which is possible by way of generator braking of a hybrid vehicle.

10. The brake system as claimed in claim 1, wherein a hydraulic connection which is configured to be opened by a 2/2 way valve, which is configured to be activated electromagnetically and is closed when no current is flowing, is provided between the master brake cylinder pressure spaces, and wherein the master brake cylinder pressure spaces are configured to be connected to the pressure medium reservoir vessel by, in each case, a further 2/2 way valve which is configured to be activated electromagnetically and is closed when no current is flowing.

11. The brake system as claimed in claim 10 further comprising pressure sensors for sensing the pressure in the second chamber, in one of the pressure spaces of the master brake cylinder as well as pressure which is supplied by the electrically controllable pressure supply device.

12. The brake system as claimed in claim 11, wherein all 2/2 way valves which are configured to be activated electromagnetically, the pressure sensors, the pressure supply device and a rotor position sensor, which senses a rotor position of an electric motor which forms a component of the pressure supply device, are integrated in a hydraulic valve block.

13. The brake system as claimed in claim 1, wherein the brake system is configured to be operated in the brake-by-wire operating mode and is configured to be operated in a fallback operating mode without brake boosting, in which fallback operating mode only operation by the vehicle driver is possible.

14. A method for operating a brake system as claimed in claim 1, wherein in the brake-by-wire operating mode, a 2/2 way valve, which is open when no current is flowing and which is inserted between the first hydraulic chamber and the pressure medium reservoir vessel, and a second 2/2 way valve or check valve, which is open when no current is flowing and is inserted between the second hydraulic chamber and the pressure medium reservoir vessel, are switched over into a closed position and a buildup of pressure in the first chamber takes place by activating the pressure supply device in accordance with the activation of the brake pedal which is sensed by the sensor device for sensing the driver deceleration request.

15. The method for operating a brake system as claimed in claim 14, wherein in the case of pure generator braking or regenerative braking of a hybrid vehicle, the 2/2 way valve, which is open when no current is flowing and is inserted between the first hydraulic chamber and the pressure medium reservoir vessel, and the second 2/2 way valve or check valve, which is open when no current is flowing and is inserted between the second hydraulic chamber and the pressure medium reservoir vessel, are switched over into a closed position, and wherein the activation force which is applied to the brake pedal by the vehicle driver is transmitted to the simulator device by the input force element, wherein the pressure supply device is not activated and no hydraulic brake buildup of pressure occurs.

16. The method for operating a brake system as claimed in claim 15, wherein in a highly dynamic braking process, the 2/2 way valve, which is open when no current is flowing and is inserted between the first hydraulic chamber and the pressure medium reservoir vessel, and the second 2/2 way valve or check valve which is open when no current is flowing and is inserted between the second hydraulic chamber and the pressure medium reservoir vessel, are switched over into a closed position and a buildup of pressure in the first chamber takes place both as a result of activation of the pressure supply device and by connecting a high pressure accumulator into the circuit by opening a high pressure accumulator charging valve in accordance with the activation of the brake pedal which is sensed by the sensor device for sensing the driver deceleration request.

17. The method for operating a brake system as claimed in claim 16, wherein in the case of an autonomous buildup in pressure, the 2/2 way valve, which is open when no current is flowing and which is inserted between the first hydraulic chamber and the pressure medium reservoir vessel, and the second 2/2 way valve or check valve, which is open when no current is flowing and is inserted between the second hydraulic chamber and the pressure medium reservoir vessel, are switched over into a closed position and a buildup of pressure in the first chamber takes place in accordance with the request of an assistance system present in the motor vehicle by activation of the pressure supply device.

18. The method for operating a brake system as claimed in claim 17, wherein in the case of an insufficient electrical supply, the 2/2 way valve, which is open when no current is flowing and is inserted between the first hydraulic chamber and the pressure medium reservoir vessel, and the second 2/2 way valve or check valve, which is open when no current is flowing and is inserted between the second hydraulic chamber and the pressure medium reservoir vessel, remain in an open switched position, and wherein a buildup of pressure in the master brake cylinder occurs as a result of transmission of the activation force which is applied to the brake pedal to the master brake cylinder piston via the input force element, the simulator device and the restraining piston, wherein the activation travel at the brake pedal is formed by the sum of a first travel component, which corresponds to the pressure medium volume takeup by the brake system components which are connected downstream of the master brake cylinder, and of a second travel component, which is produced as a result of compression of the simulator device.

19. The method for operating a brake system as claimed in claim 18, wherein the transmission of the activating force, which is applied to the brake pedal, to the master brake cylinder piston occurs by mechanical contact between the input force element and the protrusion of the master brake cylinder piston.

20. The method for operating a brake system as claimed in claim 19, wherein the 2/2 way valves, which are open when no current is flowing, which can be activated electromagnetically and which act between the master brake cylinder pressure spaces and the pressure medium reservoir vessel, and a third 2/2 way valve, which is open when no current is flowing and is connected between the electrically controllable pressure supply device and the first chamber, are switched over into a closed position and a fourth 2/2 way valve, which is closed when no current is flowing, is configured to be activated electromechanically and is inserted between the master brake cylinder pressure spaces, and a fifth 2/2 way valve, which is closed when no current is flowing and is provided between the pressure supply device and one of the master brake cylinder pressure spaces, is switched to an open switched position, wherein the pressure supply device is activated in such a way that extraction of a defined quantity of pressure medium from wheel brakes connected to the master brake cylinder and freewheeling of brake disks of said wheel brakes is made possible.

21. The method for operating a brake system as claimed in claim 19, wherein, in order to charge the high pressure accumulator, all the connections between the master brake cylinder pressure spaces and the wheel brakes are shut off, the 2/2 way valve, which is open when no current is flowing and is inserted between the first hydraulic chamber and the pressure medium reservoir vessel, and the second 2/2 way valve or check valve, which is open when no current is flowing and is inserted between the second hydraulic chamber and the pressure medium reservoir vessel, are switched over into a closed position, and wherein a further check valve, which is provided between the electrically controllable pressure supply device and the high pressure accumulator, is opened and the pressure supply device is activated with the effect of generating pressure.

* * * * *